March 21, 1939.  R. W. SULLIVAN  2,151,339
PROCESS OF MAKING CALCIUM SULPHATE
Filed April 20, 1935
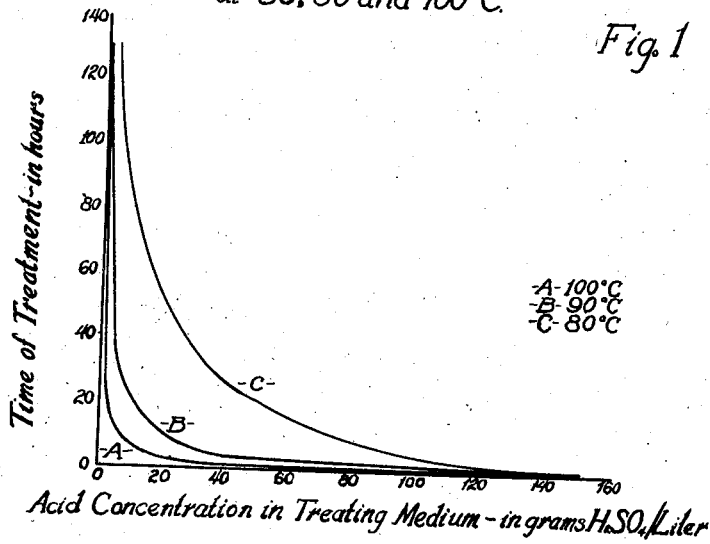
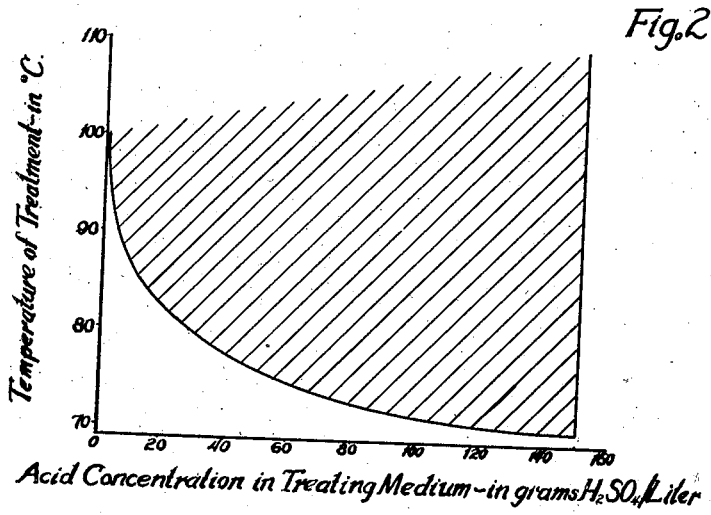
INVENTOR.
Roy W. Sullivan
BY
ATTORNEY.

Patented Mar. 21, 1939

2,151,339

UNITED STATES PATENT OFFICE 2,151,339

PROCESS OF MAKING CALCIUM SULPHATE

Roy W. Sullivan, Wilmington, Del., assignor, by mesne assignments, to E. I. du Pont de Nemours and Company, a corporation of Delaware Application April 20, 1935, Serial No. 17,379

13 Claims. (Cl. 23—122)

The present invention relates to a process of producing an anhydrous calcium sulphate of high pigment quality and fine particle size by controlled precipitation from lime slurry and sulphuric acid, and consists in reacting with a lime slurry upon strong sulphuric acid and continuing the neutralization past the point where gypsum is precipitated but maintaining the acid concentration and the temperature above certain limits as will be later defined.

I am aware that Washburn and Aagaard in their U. S. Patents #1,906,729 and 1,906,730 describe a method of producing anhydrous calcium sulphate directly from lime, namely calcium oxide, (quick lime); hydroxide (hydrated lime), or carbonate (lime stone), and sulphuric acid. The product is anhydrous, "having a crystalline structure which microscopic and X-ray examinations have determined to be that of anhydrite".

The process of Washburn and Aagaard is operative under conditions where a large excess of sulphuric acid is present throughout the reaction so as to maintain dehydrating conditions in the reaction mixture. It may be seen from the examples given in these patents, that the following proportions of acid were converted to calcium sulphate: 26%, 28%, 43% and 62%. My investigation has confirmed the fact that their process is only applicable when less than 65% and preferably less than 50% of the acid is neutralized by the lime. When their process is employed in such a manner as to neutralize more than 65% of the acid, one obtains a product which contains substantial amounts of hydrated calcium sulphate.

The Washburn and Aagaard process consists simply of adding dilute lime slurry (about 7–8% CaO) to commercial sulphuric acid of 60° Bé or 78% $H_2SO_4$ concentration until up to a maximum of 62% of the acid is neutralized. This gives an anhydrous product. If carried beyond this stage by continuing the addition of the dilute lime slurry the remaining acid becomes so weak as to lose its dehydrating power and a hydrated modification of calcium sulphate such as gypsum precipitates.

The object of the present invention is to produce an anhydrous calcium sulphate of high pigment quality and fine particle size by controlled precipitation from lime slurry and sulphuric acid with substantially 100% acid conversion not possible heretofore; said calcium sulphate consists practically completely of insoluble anhydrite and is stable under all practical conditions.

I have found that the mixture of anhydrous and hydrated calcium sulphate which one obtains by further neutralizing with lime the excess sulphuric acid in the Washburn and Aagaard process, can be transformed into a valuable substantially anhydrous product if it is treated under controlled conditions of acidity and temperature in its residual mother liquor or a liquor of similar composition.

The attached Figure 1 contains a series of curves showing the relationship between the time of treatment and the acid concentration in the treating liquor. The curve A is for treatment at 100° C., B at 90° C. and C at 80° C.

Figure 2 shows a curve which gives the minimum acid concentration necessary to convert to substantially anhydrous calcium sulphate the reaction product containing substantial amounts of hydrated calcium sulphate obtained by the neutralization of more than 65% of the acid at various temperatures above 70° C. within a practical time limit.

For a better understanding of the controlling conditions which are part of my process, I shall first present experimental data relating to the conditions obtaining in the Washburn and Aagaard process and in my further development thereof.

I have prepared calcium sulphate exactly as described by Washburn and Aagaard in their U. S. Patent 1,906,729, Example I, page 3, lines 55–58, and Example II, page 3, lines 75–78; and in their U. S. Patent 1,906,730, Example I, page 3, lines 75–78 and Example II, page 3, lines 106–109. In each case anhydrite was formed directly by the reaction of strong sulphuric acid and lime slurry.

Example II of U. S. Patent 1,906,730 represents the highest neutralization of the sulphuric acid (62%), according to patentee's process, and has been duplicated as follows:

Experiment A

To 970 grams (106 parts) of sulphuric acid containing 78% $H_2SO_4$ at a temperature of 20° C. was added a slurry of 270 grams of CaO corresponding to 357 grams (39 parts) of hydrated lime in 3.31 liters (corresponding to 44 gallons) of water at 70° C. The resulting calcium sulphate was filtered, washed, and analyzed. It was found to consist of anhydrite with 3.8% of gypsum.

To illustrate the fact that on further neutralization gypsum is formed in large amounts, the same experiment was repeated except that the addition of lime was continued beyond the point where 62% of the acid was neutralized up to the point where 90% of the acid was neutralized. This is described in:

Experiment B

To 970 grams (106 parts) of sulphuric acid containing 78% $H_2SO_4$ at a temperature of 20° C. was added a slurry of 270 grams of CaO corresponding to 357 grams (39 parts) of hydrated lime in 3.31 liters (corresponding to 44 gallons) of water at 70° C. The neutralization of the acid was continued by further addition of 120 grams CaO in 1.50 liters of water at 70° C. This corresponded to 90% neutralization of the acid. The resulting calcium sulphate was filtered, washed and analyzed. It was found to contain 30.8% gypsum, the balance being anhydrite.

It will be seen from this example that when the neutralization is carried above 62% of the acid, the product obtained is a mixture of anhydrite with considerable amounts of gypsum, which render it valueless for many important applications.

The following examples illustrate the application of my invention as modifying the process of Experiment B.

Experiment C

Experiment B was repeated exactly, except that the calcium sulphate was not separated from its mother liquor. The slurry of calcium sulphate and its mother liquor was then boiled without appreciable concentration for several hours and samples removed and tested at hourly intervals. The following data were obtained:

| Hrs. of boiling | Percent gypsum in the product |
|---|---|
| 0 | 30.8 |
| 1 | 7.2 |
| 2 | 5.3 |
| 3 | 4.1 |

The product as obtained, containing a few percent of gypsum, is suitable for many important technical uses, it is equivalent to the Washburn and Aagaard product, and can be considered as being substantially anhydrite.

In Experiment C I achieved the dehydration of a mixture of anhydrite and gypsum under slightly acid conditions.

Experiment D

The following experiments show the relationship between temperature of treatment and the acid concentration in the treating medium.

Materials

High grade commercial pebble lime slaked at a 5 to 1 ratio and screened thru 200 mesh. Commercial 60° Bé. sulphuric acid (containing 78% $H_2SO_4$). 125 cc. round bottom flasks. Thermostats adjusted to 100° C., 90° C. and 80 C.

Preparation of material for treatment

To 970 grams of sulphuric acid containing 78% $H_2SO_4$ at a temperature of 25° C. was added 2834 grams of a lime slurry at 70° C. containing 14.5% CaO. The temperature at the conclusion of the reaction was 100° C. and 95% of the acid was neutralized. The solid reaction product contained 28.2% gypsum.

Immediately following the completion of the reaction, the batch was divided into 4 parts and the acid concentration adjusted to 10, 25, 50 and 100 grams $H_2SO_4$ per liter respectively, at a slurry ratio of 6 to 1. Small portions representing the above acid concentrations were then sealed in 125 cc. round bottom flasks and placed in thermostats, maintained at 100° C., 90° C. and 80° C. At frequent intervals of time samples were removed, washed, freed from uncombined water by washing with alcohol and ether and analyzed for gypsum. Due to the fact that the slurries became quite thick in a short time after being held at temperature it was impossible to agitate the contents of the flasks.

The results of these and similar experiments are plotted as curves A, B and C in Figure 1.

The experiments were also repeated at lower temperatures and it was found that at 70° C. more than 120 hours were required to dehydrate at an acid concentration of 100 g./l., whereas at lower acid concentrations and at still lower temperatures, dehydration was not obtained.

My novel procedure is outlined below in detail. My preferred procedure is to add slowly with sufficient agitation a milk of lime slurry containing about 15% to 20% lime figured as CaO at ordinary temperature to a 78% sulphuric acid solution also at ordinary temperature, until about 95% of the acid has been neutralized. After passing 65% neutralization of the acid, gypsum is precipitated as long acicular crystals. At the start of my precipitation procedure the temperature of the reactants rises rapidly due to the liberated heat of reaction to a maximum of above 100° C. before it falls off due to continued dilution and it is preferred to maintain artificially the temperature above at least 80° C. until about 95% of the acid has been neutralized.

The period of treatment can be made coextensive with the latter stage of the neutralization, after substantial amounts of the acid have been neutralized. For example, I may neutralize up to 65% of the sulphuric acid by rapid addition of the lime slurry and then retard the rate of addition of the remainder of the lime slurry while maintaining my preferred conditions of temperature and acid concentration, thus decreasing the total period required for substantial conversion to anhydrite.

Features which are useful but can be varied without departing from the spirit of my invention include for instance the following:

My process does not necessitate any expensive equipment such as pressure vessels, since I can operate successfully at atmospheric pressure; moreover I can obtain substantial conversion to anhydrite in a period of less than 10 hours.

For the lime slurry I prefer to use a good grade of high CaO content quick lime but previously hydrated lime can be employed altho it has the disadvantage that the product is sometimes poorer and also that the initial cost is greater. Similarly calcium carbonate can be used. Either of the two grades of lime known as lump (vertical kiln) lime and pebble (rotary kiln) lime are found to be satisfactory. The lime is slaked by the usual chemical method in an excess of cold water, altho slaking in hot water is known to give a slight advantage in that it gives a smoother slurry with possibly smaller lime particles, but it is not practiced because of the added cost nor is it necessary to the success of my process. The lime slurry may be treated by some known wet milling system to break up any unslaked lumps and to improve the dispersion of the milk. This step is not essential but facilitates my process by allowing a shorter time for neutralization to about 95% conversion of the acid.

The lime slurry is finally adjusted to the preferred concentration which is as high in CaO content as can be conveniently and economically handled. For lime from a number of sources this figure is about 15 to 20% CaO and is fixed by the thickest consistency slurry that can be pumped altho lime from a few sources can be handled in concentrations up to as high as 22%.

The advantage in the preferred lime concentrations lies in the slower rate of dilution of the acid during the progress of the precipitation and in the higher acid concentration remaining at the end of the addition. This allows a somewhat faster rate of precipitation, or shorter treatment after precipitation or more complete neutralization of the acid or if desired, a combination of all three advantages.

For the acid I prefer to use the regular commercial grade of 60° Bé. (78% $H_2SO_4$) sulphuric acid. The stronger grades are advantageous but their higher cost does not justify their use in view of the excellent results obtained with the 60° Bé. acid. With 15% CaO lime slurry the lowest concentration of acid which still gave satisfactory results is about 56° Bé. With a more concentrated lime slurry somewhat lower than 56° acid can be used but my experience shows that the most satisfactory operation is obtained when the acid concentration is at or close to 60° Bé. at the start of the precipitation and the lime concentration controlled to a minimum of 15% CaO. These conditions assure an ample safety margin to take care of accidental dilution and also the dilution arising from the direct steam heating which may be applied during the treatment of the hydrated calcium sulphate.

In my novel procedure the reactants in the precipitation step, namely the lime slurry and sulphuric acid are brought together by mixing the lime with the strong acid with thorough agitation.

To avoid occasional over-neutralization and consequent precipitation of off-colored impurities such as iron, usually contained in either the acid or the lime slurry, I prefer to remain on the acid side. I regard 95% neutralization as both an economical and a safe figure and contrive to control my precipitation so as to complete it at this figure by careful measurement of both reactants. Neutralization of 75 to 95% of the acid gives an equally good product and is practical and contemplated in my process.

The gypsum formed during the latter stages of the neutralization is present as relatively large acicular crystals, which can readily be distinguished under the microscope at about 400 magnifications.

The mixture of anhydrite and hydrated calcium sulphate as obtained by neutralization of at least 75% of the sulphuric acid is then treated in an aqueous medium at elevated temperatures under controlled conditions as explained above, until the mixture is substantially completely transformed into anhydrous calcium sulphate. During this subsequent treatment step the acicular crystals gradually disappear owing to their conversion to anhydrite and the treatment is continued until substantially none remain.

Altho in the preferred procedure the finished slurry contains only about in the neighborhood of 25–30% solids, it has a thick plastic character. This is believed to be due to the extremely small size of the anhydrite particles. If it is much too thick to pump it must be diluted with at least an equal volume of water to facilitate pumping. For this reason the precipitation must be made in a sufficiently large vessel to allow this dilution after the treatment is completed. When treated according to my invention the product is sufficiently stable to allow dilution with cold water and subsequent filtration and washing without substantial re-hydration.

Following the above dilution the slurry is filtered and washed by known methods either in washing presses or on continuous rotary filters or in other such standard equipment. The chief requisite is to remove substantially all soluble impurities, principaly iron and of course the excess sulphuric acid. In washing presses this can be accomplished in one operation, washing for from one to three hours, or until the washings run iron free and have a pH of about 4. On continuous filters a convenient procedure is to use two filters in series, with a repulping step between. With washing on both filters a final cake having a pH of 5 to 6 is obtained.

In respect to the limiting conditions of acidity and temperature, I have found that at temperatures below 70° C. and acid concentrations below 150 grams $H_2SO_4$/liter, no substantial dehydration can be obtained. At temperatures of 70° C. and above and concentrations below 150 grams $H_2SO_4$/liter, the rate of dehydration for each acid concentration will fall with the temperature. Other factors which affect the rate of dehydration at the various acid concentrations and temperatures include concentration of the slurry, and agitation.

The influence of temperatures and acid concentrations is illustrated in curve of Figure 2. The data upon which this curve is based result from a large number of carefully controlled operations where excellent agitation was maintained and in which substantially complete dehydration was obtained in a practical period of time. When following the conditions as exemplified by this curve, one will obtain an economical practical process for obtaining a substantially anhydrous calcium sulphate by neutralizing more than 75% of the sulphuric acid with lime.

The shaded area above the curve represents conditions at which, in practical large scale operation, substantially complete dehydration can be obtained.

On the vertical axis of Figure 2 are plotted the temperatures in degrees C. of the treatment, and on the horizontal axis the concentrations of sulphuric acid in grams $H_2SO_4$/liter of the treating medium in which the solid reaction product containing hydrated calcium sulphate has been dehydrated according to my invention. A few typical points on this curve are as follows:

| Temperature, °C. | Concentrations—grams $H_2SO_4$/liter |
|---|---|
| 100 | 1.5 |
| 90 | 4.5 |
| 80 | 27.0 |
| 75 | 54 |
| 70 | 150 |

This curve represents critical limiting conditions and the shaded area above the curve represents the field of my invention.

The curve of Figure 2 is not extended above 150 grams $H_2SO_4$/liter, nor do I claim higher concentrations, as by using such concentrations I would not obtain one of the benefits of my invention, namely a very large utilization of the sulphuric acid for neutralization of the lime. As a matter of fact, in the preferred embodiment of my invention I contemplate only such conditions in which the neutralization is carried out to the point where the mother liquor contains not more than 75 grams $H_2SO_4$/liter.

The following examples will further serve to illustrate the performance of my novel process:

*Example I*

Lime slurry was first prepared by slaking a good grade of high calcium rotary kiln quick lime in five parts of water. The milk was passed thru a cage type disintegrator and then to storage. The concentration was determined as 156 grams CaO per liter which was considered satisfactory without adjustment. The temperature just before use had dropped to 30° C.

125 gallons of 59.6° Bé. sulphuric acid at 20° C. (containing 1364 lbs. $H_2SO_4$) were run into a lead lined wooden tank of 1600 gallons capacity. This tank was equipped with a turbine agitator rotated at 150 R. P. M. by a 10 H. P. motor. 510 gallons of the above lime slurry (containing 665 lbs. of CaO) were then run in at a constant rate over a period of 35 minutes, constant agitation being maintained from the start. At the end of four minutes the temperature had risen from 20° C. to the maximum of about 110° C. and violent ebullition began. After 18 more minutes the temperature had dropped to 100° C. and boiling stopped. Shortly afterwards a 1″ steam line delivering high pressure steam to the bottom of the tank was opened part way to prevent excessive cooling. After the conclusion of the lime addition the reaction mass contained very substantial amounts of gypsum. It was then treated with constant agitation and steam addition and the temperature maintained at about 100° C. Microscopic examinations were made every 15 minutes at 400 magnifications, whereby it was found that after one hour's treatment substantially no acicular gypsum crystals remained. The steam was then turned off. The concentration of acid in the liquor at the end of the treatment was found to be 38 grams $H_2SO_4$ per liter.

The finished strike was then diluted with 700 gallons cold water, filtered and washed in a wooden plate and frame washing press until the wash water ran about 4 pH. The product was a stable anhydrite of extremely white color and of extremely uniform particle size averaging about 0.5 micron. 86% of the acid was neutralized in this example.

*Example II*

Lime slurry was prepared as in Example I except that the final concentration was 180 grams CaO per liter and the temperature just before use was 35° C.

1250 gallons of 59.9° Bé. sulphuric acid at 20° C. (containing 13,830 lbs. $H_2SO_4$) was run into a lead lined steel tank of 16,500 gallons capacity. This tank was equipped with a very powerful sweep-type agitator propeller at 20 R. P. M. by a 100 H. P. motor and also with a series of steam inlets arranged around the bottom to give the maximum of agitation from the steam addition. 5,000 gallons of the above lime slurry (containing 7500 lbs. CaO) was then run in at a constant rate over a period of 45 minutes with constant agitation from the start. In five minutes the temperature rose to the maximum of 115° C. and violent ebullition began. In 23 more minutes the temperature had dropped to 100° C. and boiling stopped. Soon afterwards steam addition was begun to prevent too much cooling due to the continued addition of cold lime slurry. At the end of the lime addition a large amount of gypsum was present in the calcium sulphate slurry. 95% of the acid was neutralized by the lime.

The suspension containing gypsum was treated in the presence of its acid mother liquor containing 14 grams $H_2SO_4$ per liter by agitating it and maintaining a temperature of about 100° C. Microscopic examinations showed that the gypsum crystals had practically disappeared after 45 minutes of such treatment.

The finished strike was diluted with 7,000 gallons of cold water, filtered and washed on two continuous rotary filters, in series. The final wash cake tested 5 pH and was found to consist substantially of anhydrite.

In the above examples I have always described the treatment of the precipitated calcium sulphate obtained by neutralization of more than 75% of the acid in its own mother liquor; in unusual cases such mother liquor might not be suitable, due for example to large amounts of impurities in the sulphuric acid or lime used, in such cases I may separate the calcium sulphate from its mother liquor and conduct the treatment in fresh acid, always maintaining conditions of temperature and acidity as specified herein.

It is not always necessary to use the acid concentrations and temperatures shown in these examples; with lower acid concentrations and temperatures the time of treatment required for substantial dehydration will increase, but unless the temperatures and acid concentrations are reduced to an undue degree, the substantial conversion to anhydrite can be obtained within 10 hours.

The invention has further been exemplified above in connection with the use of calcium hydroxide, but it will be understood that, the same as in the Washburn and Aagaard process, it will be applicable to calcium carbonate. Accordingly, calcium compounds adapted for use in the invention comprise calcium oxide (quick lime), hydroxide (hydrated lime), and carbonate (lime stone).

I claim:

1. In a process of making insoluble anhydrite which includes as one step the addition of a calcium compound from the group consisting of an oxide, hydroxide and carbonate to strong sulphuric acid in the absence of separately prepared and added anhydrite, the steps of neutralizing at least 75% of said acid with said calcium compound beyond the point where a solid reaction product containing substantial amounts of hydrated calcium sulphate suspended in a liquid is formed, and treating the solid reaction product containing hydrated calcium sulphate for a substantial length of time, suspended in an acid aqueous medium containing not less than 1.5 and not more than 150 grams $H_2SO_4$ per liter and at a temperature of not less than 80° C., nor exceeding about 100° C. until the product is substantially dehydrated.

2. In a process of making insoluble anhydrite which includes as one step the addition of a calcium compound from the group consisting of an oxide, hydroxide and carbonate to strong sulphuric acid in the absence of separately prepared and added anhydrite, the steps of neutralizing the sulphuric acid to beyond the point where gypsum is formed, and continuing the calcium carbonate addition until substantially all of said acid is neutralized with formation of substantial amounts of gypsum, and treating the solid reaction product containing hydrated calcium sulphate for a substantial length of time, suspended in an acid aqueous medium containing not less than 1.5 and not more than 150 grams H₂SO₄ per liter and at a temperature of not less than 80° C., nor exceeding about 100° C. until the product is substantially dehydrated.

3. The process of claim 1, in which said acid aqueous medium in which said solid reaction product is suspended comprises the mother liquor in which said solid reaction product was formed.

4. In a process of making insoluble anhydrite which includes as one step the addition of a calcium compound from the group consisting of an oxide, hydroxide and carbonate to strong sulphuric acid in the absence of separately prepared and added anhydrite, the steps of neutralizing at least 75% of said acid with said calcium compound beyond a point where a solid reaction product containing substantial amounts of hydrated calcium sulphate suspended in a liquid is formed, and treating the solid reaction product containing hydrated calcium sulphate for a substantial length of time, suspended in an acid aqueous medium containing not less than 1.5 and not more than 75 grams H₂SO₄ per liter and at a temperature of not less than 80° C., nor exceeding about 100° C. until the product is substantially dehydrated.

5. The process of claim 4, in which said acid aqueous medium in which said solid reaction product is suspended, comprises the mother liquor in which said solid reaction product was formed.

6. In a process of making insoluble anhydrite which includes as one step the addition of an aqueous suspension of calcium hydroxide to strong sulphuric acid in the absence of separately prepared and added anhydrite, the steps of neutralizing at least 85% of said acid with said lime slurry beyond a point where a reaction product containing substantial amounts of hydrated calcium sulphate is formed suspended in a mother liquor containing from 10 to 50 grams H₂SO₄ per liter, and heating said reaction product in said mother liquor for at least 45 minutes at about 100° C.

7. A process for producing insoluble anhydrite in the absence of any separately prepared and added anhydrite, comprising adding a calcium compound from the group consisting of an oxide, hydroxide and carbonate to strong sulphuric acid, neutralizing the acid to substantially complete conversion and beyond the point where substantial amounts of gypsum form and the resultant mother liquor at atmospheric temperatures is substantially hydrating in character, thereupon maintaining a mother liquor sulphuric acid concentration of not less than about 1.5 nor more than about 150 g./l., heating said mother liquor and its contained gypsum product to a temperature of not less than 70° C. and not exceeding about 100° C., and continuing said heating until said gypsum becomes substantially dehydrated.

8. A process for producing high pigment quality, fine particle size, insoluble anhydrite, without addition and presence of separately prepared anhydrite, comprising adding a calcium compound from the group consisting of an oxide, hydroxide and carbonate to strong sulphuric acid, neutralizing the acid to substantially 100% conversion, and beyond the point where substantial amounts of gypsum form and the mother liquor at atmospheric temperatures is substantially hydrating in character, controlling the sulphuric acid concentration in said mother liquor within a range of substantially 1.5 g./l. to 150 g./l., thence subjecting said liquor and its gypsum content to heat treatment at a temperature in excess of 70° C. but not exceeding about 100° C. and until substantially complete dehydration of said gypsum is effected.

9. A process for producing fine particle size, pigment quality, insoluble anhydrite, comprising adding a calcium compound from the group consisting of an oxide, hydroxide and carbonate to strong sulphuric acid, neutralizing at least 75% of said acid and until substantial amounts of gypsum form in the resultant calcium sulphate precipitate, and thence digesting said precipitate in a dilute acid medium having an H₂SO₄ concentration of not less than about 1.5 nor in excess of about 150 g./l., at a temperature in excess of 70° C., and ranging to about 100° C., until the same becomes substantially anhydrous.

10. A process for producing fine particle size, pigment quality, insoluble anhydrite, comprising adding a calcium compound from the group consisting of an oxide, hydroxide and carbonate to strong sulphuric acid, neutralizing from 75 to 95% of said acid and forming substantial amounts of gypsum in the resultant calcium sulphate precipitate, thence digesting the said precipitate in its mother liquor at a temperature in excess of 70° C. and ranging to about 100° C., while maintaining said liquor at an H₂SO₄ concentration of not less than 1.5 and not to exceed 150 g./l. until said precipitate becomes substantially anhydrous.

11. A process for producing fine particle size, pigment quality, insoluble anhydrite, comprising adding lime to strong sulphuric acid, neutralizing from 75 to 95% of said acid and forming substantial amounts of gypsum in the resultant calcium sulphate precipitate, and thence digesting said precipitate for a period of at least forty-five minutes, to render the same substantially anhydrous, in dilute acid media at a temperature of at least 70° C. and ranging to about 100° C., while maintaining an H₂SO₄ concentration in said media of not less than 1.5 nor more than 150 g./l.

12. A process for producing pigment quality, insoluble anhydrite, comprising adding calcium carbonate to strong sulphuric acid, neutralizing at least 75% of said acid therewith and until substantial amounts of gypsum form in the resultant calcium sulphate precipitate, and thence digesting said precipitate in a dilute acid medium having an H₂SO₄ concentration of not less than about 1.5 nor more than about 75 g./l., at a temperature in excess of 70° C. and to about 100° C. until the same becomes substantially anhydrous.

13. A process for producing pigment quality, insoluble anhydrite, comprising adding calcium hydroxide to strong sulphuric acid, neutralizing at least 75% of said acid therewith and until substantial amounts of gypsum form in the resultant calcium sulphate precipitate, and thence digesting said precipitate in a dilute acid medium having an H₂SO₄ concentration of not less than about 1.5 nor more than about 75 g./l., at a temperature in excess of 70° C. and to about 100° C. until the same becomes substantially anyhdrous.

ROY W. SULLIVAN.

CERTIFICATE OF CORRECTION.

Patent No. 2,151,339. March 21, 1939.

ROY W. SULLIVAN.

It is hereby certified that error appears in the printed specification of the above numbered patent requiring correction as follows: Page 2, first column, line 64, for "80 C." read 80°C.; page 3, second column, line 15, for "principaly" read principally; page 4, first column, line 65, for "propeller" read propelled; page 4, second column, line 75, claim 2, for "carbonate" read compound; page 5, second column, line 39, claim 11, strike out "lime" and insert instead a calcium compound from the group consisting of an oxide, hydroxide and carbonate; and that the said Letters Patent should be read with this correction therein that the same may conform to the record of the case in the Patent Office.

Signed and sealed this 16th day of May, A. D. 1939.

(Seal)

Henry Van Arsdale
Acting Commissioner of Patents.